US009824695B2

(12) United States Patent
Lyle et al.

(10) Patent No.: US 9,824,695 B2
(45) Date of Patent: Nov. 21, 2017

(54) ENHANCING COMPREHENSION IN VOICE COMMUNICATIONS

(75) Inventors: Ruthie D. Lyle, Durham, NC (US); Patrick Joseph O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 13/525,450

(22) Filed: Jun. 18, 2012

(65) Prior Publication Data

US 2013/0339007 A1 Dec. 19, 2013

(51) Int. Cl.

| | |
|---|---|
| ***G06F 17/27*** | (2006.01) |
| ***G10L 19/00*** | (2013.01) |
| ***G10L 25/00*** | (2013.01) |
| ***G10L 13/00*** | (2006.01) |
| ***G10L 15/00*** | (2013.01) |
| ***G10L 21/003*** | (2013.01) |
| *G10L 21/0364* | (2013.01) |
| *G10L 21/057* | (2013.01) |

(52) U.S. Cl.

CPC ........ *G10L 21/003* (2013.01); *G10L 21/0364* (2013.01); *G10L 21/057* (2013.01)

(58) Field of Classification Search

CPC ....... G06F 17/289; G06F 17/28; G10L 15/22; G10L 15/26; G10L 15/30; G10L 2015/223; G10L 25/48; G10L 15/24; G10L 15/265; H04M 3/4936

USPC ... 704/1–10, 200–201, 258–269, 270–270.1, 704/271, 277, E17.001–E17.016, 704/E15.001–E15.004, E21.001–E21.02, 704/231, 235

See application file for complete search history.

(56) References Cited

U.S. PATENT DOCUMENTS 4,624,012 A * 11/1986 Lin .......................... G10L 21/00 704/261
5,636,325 A * 6/1997 Farrett .......................... 704/258
5,729,694 A * 3/1998 Holzrichter et al. ........... 705/17
5,750,912 A * 5/1998 Matsumoto ..................... 84/609
5,860,064 A * 1/1999 Henton ................. G10L 13/033 204/266
5,884,250 A * 3/1999 Ono ...................... H04M 1/725 704/201
5,911,129 A * 6/1999 Towell ....................... 704/270.1
5,920,840 A * 7/1999 Satyamurti ............. G10L 21/04 704/267
5,943,648 A * 8/1999 Tel .......................... G10L 13/08 704/258
6,178,400 B1 1/2001 Eslambolchi
6,374,224 B1 * 4/2002 Horiguchi et al. ........... 704/266
(Continued)

*Primary Examiner* — Edgar Guerra-Erazo

(74) *Attorney, Agent, or Firm* — Brian J. Colandreo, Esq.; Jeffrey T. Placker, Esq.; Holland & Knight LLP

(57) ABSTRACT

Embodiments herein include receiving a request to modify an audio characteristic associated with a first user for a voice communication system. One or more suggested modified audio characteristics may be provided for the first user, based on, at least in part, one or more audio preferences established by another user. An input of one or more modified audio characteristics may be received for the first user for the voice communication system. A user-specific audio preference may be associated with the first user for voice communications on the voice communication system, the user-specific audio preference including the one or more modified audio characteristics.

21 Claims, 5 Drawing Sheets

(56) References Cited

U.S. PATENT DOCUMENTS 6,470,316 B1 * 10/2002 Chihara ........................ 704/267
6,598,021 B1 * 7/2003 Shambaugh et al. ......... 704/270
6,950,799 B2 * 9/2005 Bi et al. ........................ 704/261
7,412,390 B2 * 8/2008 Kobayashi et al. .......... 704/267
7,653,543 B1 * 1/2010 Blair et al. .................... 704/270
7,664,650 B2 2/2010 Endo et al.
7,822,050 B2 10/2010 DeGrazia
8,700,392 B1 * 4/2014 Hart ........................ G10L 15/25 704/231
8,756,057 B2 * 6/2014 Miller .................. G09B 21/009 704/235
8,898,568 B2 * 11/2014 Bull ........................ G06F 3/167 381/61
2002/0002460 A1 * 1/2002 Pertrushin ..................... 704/270
2002/0072900 A1 * 6/2002 Keough et al. ............... 704/220
2002/0161580 A1 * 10/2002 Taylor ........................... 704/235
2003/0078780 A1 * 4/2003 Kochanski et al. .......... 704/258
2004/0013272 A1 * 1/2004 Reams ................... H04R 3/002 381/1
2004/0054534 A1 * 3/2004 Junqua .......................... 704/258
2004/0073423 A1 * 4/2004 Freedman ..................... 704/235
2004/0148161 A1 * 7/2004 Das et al. ..................... 704/224
2004/0158457 A1 * 8/2004 Veprek et al. ................ 704/201
2004/0215451 A1 * 10/2004 Macleod ....................... 704/231
2005/0058300 A1 * 3/2005 Suzuki ................... H04R 1/406 381/92
2005/0060158 A1 * 3/2005 Endo ....................... G10L 17/26 704/275
2005/0108011 A1 * 5/2005 Keough et al. ............... 704/243
2005/0159954 A1 * 7/2005 Chu et al. ..................... 704/254
2006/0095265 A1 * 5/2006 Chu et al. ..................... 704/268
2006/0257827 A1 * 11/2006 Ellenson ....................... 434/112
2007/0005363 A1 * 1/2007 Cucerzan et al. ............ 704/256
2007/0050188 A1 * 3/2007 Blair et al. .................... 704/207
2007/0078885 A1 * 4/2007 Klein ................ G06F 17/30038
2007/0100628 A1 * 5/2007 Bodin et al. .................. 704/261
2007/0217579 A1 * 9/2007 Sobti ..................... H04M 3/533 379/67.1
2008/0015860 A1 * 1/2008 Lane ..................... G10L 13/047 704/258
2008/0046248 A1 * 2/2008 Chen ..................... G10L 19/005 704/262
2008/0086301 A1 * 4/2008 Tachibana ........... G10L 21/0208 704/201
2008/0271589 A1 * 11/2008 Lemons .................. G10L 21/06 84/477 R
2009/0043583 A1 * 2/2009 Agapi et al. .................. 704/260
2009/0316054 A1 * 12/2009 Bailey .................... G08C 19/02 348/734
2010/0235169 A1 * 9/2010 Harma .......................... 704/246
2011/0033061 A1 * 2/2011 Sakurada ............. G10H 1/0058 381/81
2011/0086629 A1 4/2011 Simmons et al.
2011/0110534 A1 * 5/2011 Lindahl et al. ............... 381/107
2012/0035908 A1 * 2/2012 Lebeau et al. .................... 704/2
2012/0282976 A1 * 11/2012 Suhami .............. G10K 11/1786 455/556.1
2013/0054251 A1 * 2/2013 Eppolito ................ H03G 7/007 704/500
2013/0117018 A1 * 5/2013 O'Sullivan et al. .......... 704/235
2013/0339007 A1 * 12/2013 Lyle et al. .................... 704/201

* cited by examiner

ENHANCING COMPREHENSION IN VOICE COMMUNICATIONS

BACKGROUND

The present disclosure generally relates to communications systems, and more particularly to communication systems that include a voice communication component.

Individuals in large organizations may often be located in multiple geographic regions. Various collaboration and communication systems may be used for interactions between individuals in different regions. Such communications systems may include unified telephony systems, Voice-over-IP systems, video conferencing systems and the like. Such communications systems may allow individuals to collaborate and work together on projects and the like even though the individuals may be in geographically dispersed locations.

BRIEF SUMMARY

In one implementation, a method, in accordance with this disclosure, may include receiving a request to modify an audio characteristic associated with a first user for a voice communication system. One or more suggested modified audio characteristics may be provided for the first user, based on, at least in part, one or more audio preferences established by another user. An input may be received of one or more modified audio characteristics for the first user for the voice communication system. The method may also include associating a user-specific audio preference with the first user for voice communications on the voice communication system, the user-specific audio preference including the one or more modified audio characteristics.

One or more of the following features may be included. The one or more audio preferences may include audio preferences established for the first user. The one or more audio preferences may include audio preferences established for a second user having a similar attribute to the first user. The similar attribute includes a geographic location associated with the first user.

The method may also include modifying an audio characteristic of the first user for a subsequent voice communication based on, at least in part, the associated user-specific audio preference. The method may also include associating the modified audio characteristics with at least a third user based on, at least in part, a similar attribute of the third user to the first user. The method may also include propagating the user-specific audio preference to one or more additional users.

In another implementation a computer program product including a non-transitory computer readable medium having a plurality of instructions stored on it is provided. When executed by a processor, the instructions may cause the processor to perform one or more operations. The operations may include receiving a request to modify an audio characteristic associated with a first user for a voice communication system. The operations may also include providing one or more suggested modified audio characteristics for the first user, based on, at least in part, one or more audio preferences established by another user. The operations may also include receiving an input of one or more modified audio characteristics for the first user for the voice communication system. The operations may further include associating a user-specific audio preference with the first user for voice communications on the voice communication system, the user-specific audio preference including the one or more modified audio characteristics.

One or more of the following features may be included. The one or more audio preferences may include audio preferences established for the first user. The one or more audio preferences may include audio preferences established for a second user having a similar attribute to the first user. The similar attribute may include a geographic location associated with the first user.

Operations may also be included for modifying an audio characteristic of the first user for a subsequent voice communication based on, at least in part, the associated user-specific audio preference. Operations may also be included for associating the modified audio characteristics with at least a third user based on, at least in part, a similar attribute of the third user to the first user. Operations may also be included for propagating the user-specific audio preference to one or more additional users.

In another implementation, a computing system including one or more processors is provided. The one or more processors may be configured to receive a request to modify an audio characteristic associated with a first user for a voice communication system. The one or more processors may also be configured to provide one or more suggested modified audio characteristics for the first user, based on, at least in part, one or more audio preferences established by another user. The one or more processors may also be configured to receive an input of one or more modified audio characteristics for the first user for the voice communication system. The one or more processors may further be configured to associate a user-specific audio preference with the first user for voice communications on the voice communication system, the user-specific audio preference including the one or more modified audio characteristics.

One or more of the following features may be included. The one or more audio preferences may include audio preferences established for the first user. The one or more audio preferences may include audio preferences established for a second user having a similar attribute to the first user. The similar attribute may include a geographic location associated with the first user.

The one or more processors may further be configured to modify an audio characteristic of the first user for a subsequent voice communication based on, at least in part, the associated user-specific audio preference. The one or more processors may further be configured to associate the modified audio characteristics with at least a third user based on, at least in part, a similar attribute of the third user to the first user. The one or more processors may further be configured to propagate the user-specific audio preference to one or more additional users.

The details of one or more implementations are set forth in the accompanying drawings and the description below. Other features and advantages will become apparent from the description, the drawings, and the claims.

DETAILED DESCRIPTION

Figure 1:
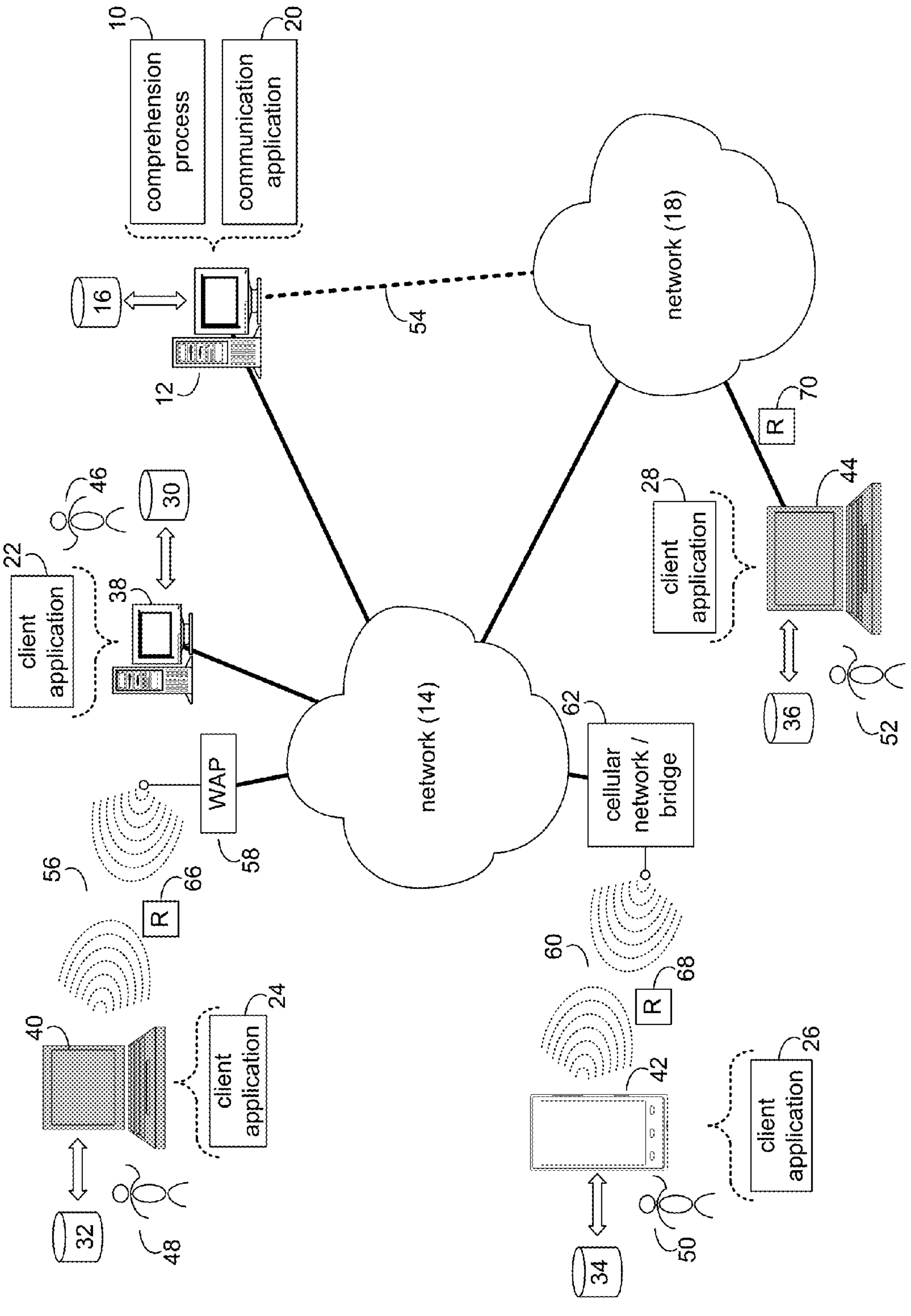
FIG. 1 diagrammatically depicts a comprehension process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, and/or in scripting languages such as JavaScript programming language or the Groovy programming language. Furthermore, various application programming interfaces (APIs) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown comprehension process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

As will be described in greater detail below, according to an embodiment comprehension process 10 may receiving 100 a request to modify an audio characteristic associated with a first user for a voice communication system. Comprehension process 10 may also provide 102 one or more suggested modified audio characteristics for the first user, based on, at least in part, one or more audio preferences established by another user. Comprehension process 10 may also receive 104 an input of one or more modified audio characteristics for the first user for the voice communication system. Further, comprehension process 10 may also associated 106 a user-specific audio preference with the first user for voice communications on the voice communication system, the user-specific audio preference including the one or more modified audio characteristics.

The instruction sets and subroutines of comprehension process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® HTTP Server, Apache® Tomcat® application server, that allows for HTTP (i.e., HyperText Transfer Protocol) access to server computer 12 via network 14 (Webserver is a trademark of Novell Corporation in the United States, other countries, or both; and Apache and Tomcat are registered trademarks of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute communication application (e.g., communication application 20), examples of which may include, but are not limited to, a unified telephony application (e.g., Lotus Sametime® Unified Telephony; Lotus and Sametime are both trademarks of International Business Machines Corporation in the United States, other countries, or both), a Voice-over-IP communication system, a video conferencing system a PBX system, and/or another communication system that may provided communications between at least two parties, in which the communication may include an audio or voice component. The instruction sets and subroutines of communication application 20 may be stored on storage device 16 coupled to server computer 12, and may be executed by one or more processors (not shown) and one or more memory architectures (not shown) incorporated into server computer 12. Communication application 20 may allow for audio and/or audio-video communications between client applications (e.g., client applications 22, 24, 26, 28) in which the communication may include an audio and/or voice component. Accordingly, in an example embodiment, communication application 20 may facilitate communications between two or more participants to communicate using a variety of devices, for example, cellular phones, fixed line phones and/or computers or computing devices. Examples of client applications 22, 24, 26, 28 may include, but are not limited to, a unified telephony application (e.g., Lotus Sametime), a Voice-over-IP application, a video conferencing application, a web browser, and/or another general purpose application and/or special purpose communication application that may allow for communication between two or more participants.

In addition/as an alternative to being a server-side process, the comprehension process may be a client-side process (not shown) that may reside on a client electronic device (described below) and may interact with a client application (e.g., one or more of client applications 22, 24, 26, 28). Further, the comprehension process may be a hybrid server-side/client-side process that may interact with server-side comprehension process and a client application (e.g., one or more of client applications 22, 24, 26, 28). As such, the comprehension process may reside, in whole, or in part, on server computer 12 and/or one or more client electronic devices.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Each of client electronic devices 38, 40, 42, 44 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.)

Using client applications 22, 24, 26, 28, users 46, 48, 50, 52 may access comprehension process 10 and may e.g., modify audio characteristics associated with a user for voice communications. Users 46, 48, 50, 52 may access comprehension process 10 directly through the device on which the client application (e.g., client applications 22, 24, 26, 28) is executed, namely client electronic devices 38, 40, 42, 44, for example. Users 46, 48, 50, 52 may access comprehension process 10 directly through network 14 or through secondary network 18. Further, server computer 12 (i.e., the computer that executes comprehension process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
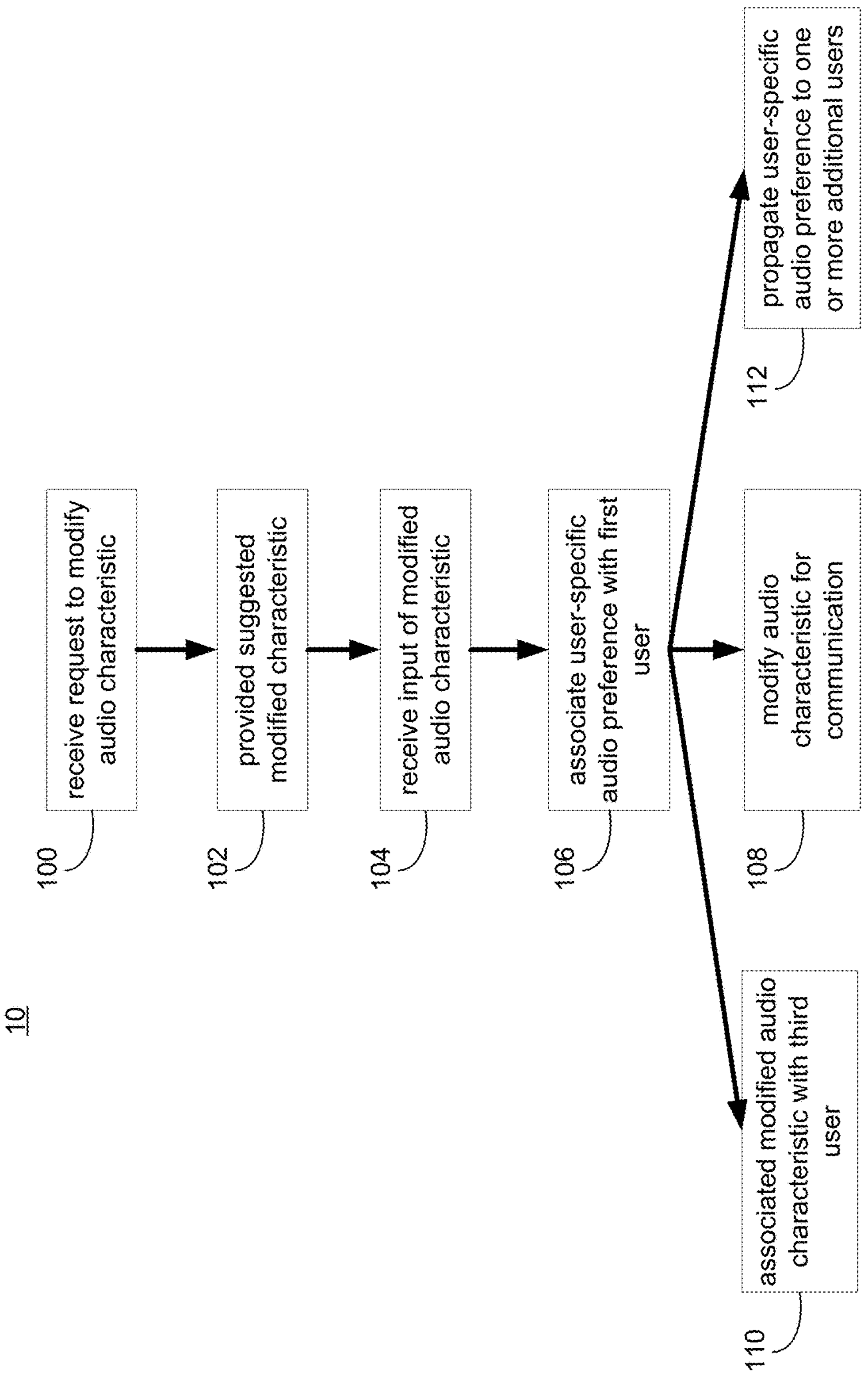
FIG. 2 is a flowchart of a process that may be executed by the comprehension process of FIG. 1.

Referring also to FIG. 2, according to one aspect, comprehension process 10 may receiving 100 a request to modify an audio characteristic associated with a first user for a voice communication system. Comprehension process 10 may also provide 102 one or more suggested modified audio characteristics for the first user, based on, at least in part, one or more audio preferences established by another user. Comprehension process 10 may also receive 104 an input of one or more modified audio characteristics for the first user for the voice communication system. Further, comprehension process 10 may also associated 106 a user-specific audio preference with the first user for voice communications on the voice communication system, the user-specific audio preference including the one or more modified audio characteristics.

For example, in some situations involving voice and/or audio communications (e.g., via a unified telephony system, PBX system, Voice-over-IP system, or any other suitable communication system) a participant of the communication may experience difficulty understanding another participant of the communication. The difficulty in understanding the other participant may, in some situations, be based on, at least in part, speech patterns and/or characteristics of the other participant. For example, some people my tend to speak relatively quickly and/or relatively quietly, which may make them difficult to understand. Further, the manner in which the participant speaks may also have an impact on comprehension. For example, various speech characteristics may impact on how difficult or easy that individual is to understand. Examples, of speech characteristics may include, for example, tonal shifts, accents, dialects, vowel emphasis, vowel pronunciation, etc. Further, how difficult or easy an individual is to understand is a subjective matter that may vary from listener to listener.

Speech characteristics that may make an individual difficult to understand may be particular to the individual, and/or may be a characteristic that is influenced by, for example, geographic region, cultural characteristics, etc. For example, individuals from Ireland and Spain may be perceived by individuals in the United States as speaking relatively fast. Similarly, individuals may speak different dialects of the same language based on geographic region or country. Various additional and/or alternative speech characteristics may be influenced by geographic, cultural, or other attributes of the participants.

Further, and as generally to above, how difficult or easy a person is to understand may be a subjective matter that may be influenced by many factors. Difficulty in understanding may be exacerbated by native language differences between the participants. For example, if a participant is not a native speaker of the language being used for the communication, the participant's proficiency in the language being used may make them difficult to understand and/or make it more difficult for them to understand others. Similarly, the participants native language may influence the manner in which the language being used for the communication is spoken (e.g., giving rise to mispronunciations, differences in tonal characteristics of the language, accented speech, and the like), and/or the ability for the participant to understand the language being used for the communication.

Figure 3:
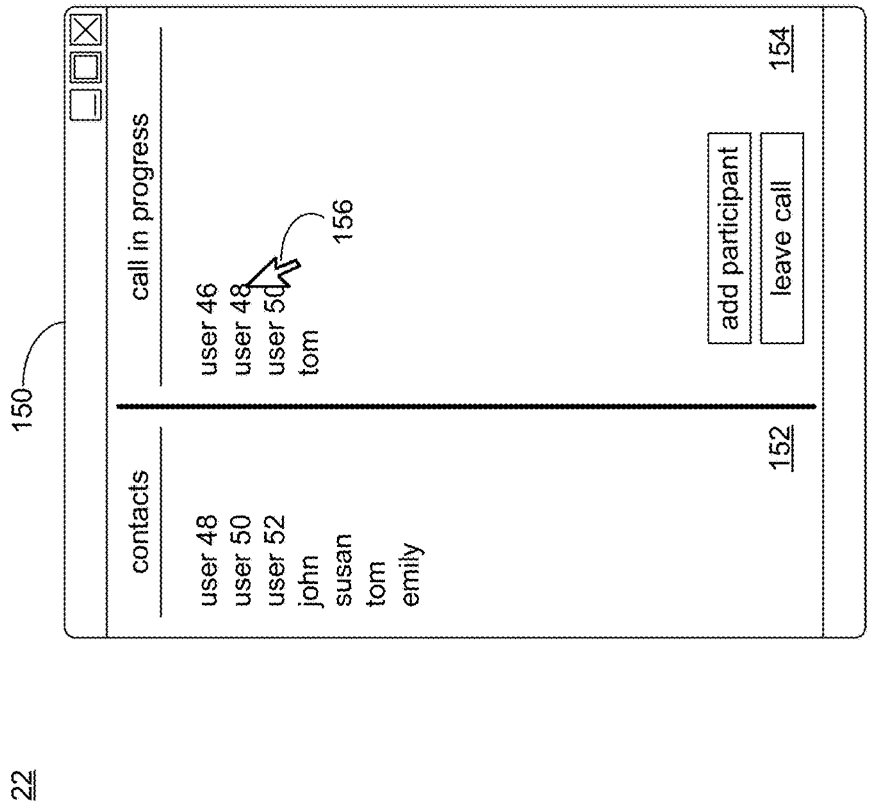
FIG. 3 graphically depicts a user interface that may be generated, at least in part, by the comprehension process of FIG. 1.

Receiving 100 a request to modify an audio characteristic associated with a first user for a voice communication system. For example, and referring also to FIG. 3, a user (e.g., user 46) may participate in a call using client application 22 (e.g., which may be part of and/or allow interaction with a voice communication system, such as a unified telephony system, or the like). As discussed above, a voice communication system may include any communication system that may include a voice communication component, such as a unified telephony system, a PBX system, a Voice-over-IP system, a video conferencing system, or the like. As shown, client application 22 may provide user interface 100, which may, for example, display contacts list 152 including an indicator associated with one or more individuals with whom user 46 may communicate via client application 22 (which may, for example, interact with communication application 20 and one or more additional client applications). Additionally, user interface 150 may provide call in progress pane 154. Call in progress pane 154 may, for example, include an indicator of participants of a currently ongoing call and/or other information regarding the ongoing call, one or more of the participants of the call, one or more call control features, and the like.

While the illustrated example generally relates an ongoing call, it should be understood that such description is intended only for the purpose of illustration and explanation, and should not be construed as a limitation on the present disclosure. Systems and methods described herein may be implemented during the course of an ongoing call, in the absence of an ongoing call, and/or otherwise implemented. Further, while various user interfaces and displays may be depicted and described, such depictions and descriptions are intended only for the purpose of explanation and example, and should not be construed as a limitation on the present disclosure.

Figure 4:
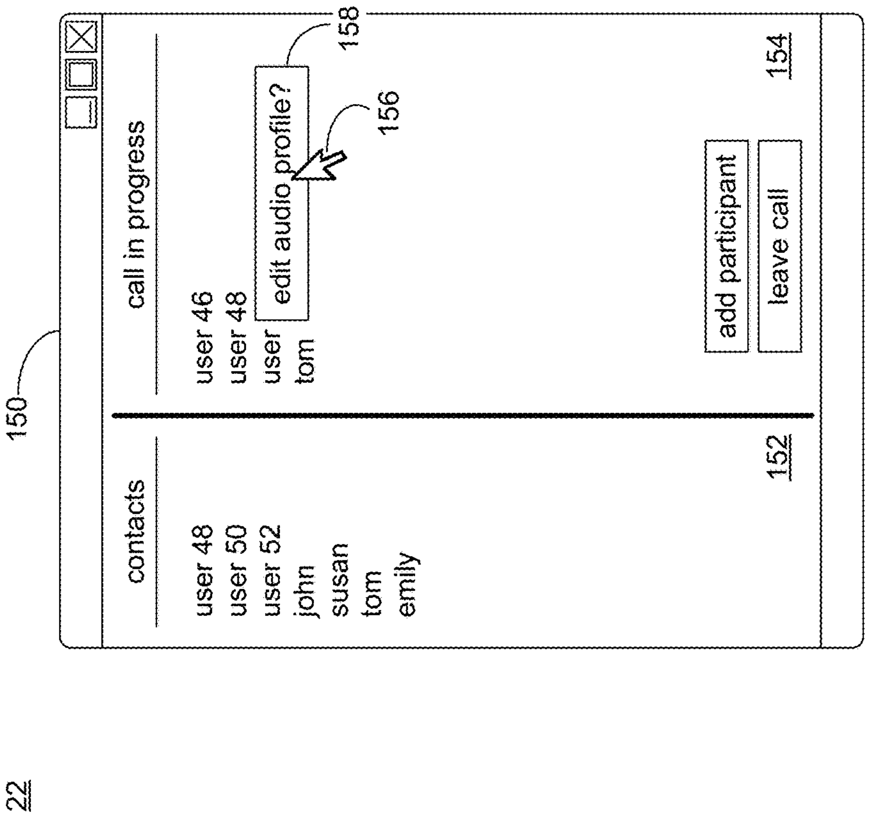
FIG. 4 graphically depicts a user interface that may be generated, at least in part, by the comprehension process of FIG. 1.

From within one or more of contacts list 152 and call in progress pane 154 user 46 may select an indicator associated with a call participant and/or an indicator associated with a contact, for example using on-screen pointer 156 (e.g., which may be controlled by a mouse or other suitable pointing device not shown). For example, user 46 may right-click on the call participant indicator "user 48." Referring also to FIG. 4, in response to user 46 right-clicking on user 48 from within call in progress pane 154, comprehension process 10 and/or client application 22 may render pop-up 158, which may include the option "edit audio profile?" User 46 may select (e.g., using on-screen pointer 156) the option "edit audio profile?" In response to user 46 selecting the option "edit audio profile?" from within pop-up 158, comprehension process 10 may receive 100 a request to modify an audio characteristic associated with a first user (e.g., user 48 in the illustrated embodiment) for a voice communication system (e.g., a communication system including communication application 20, client application 22, and/or another application).

Figure 5:
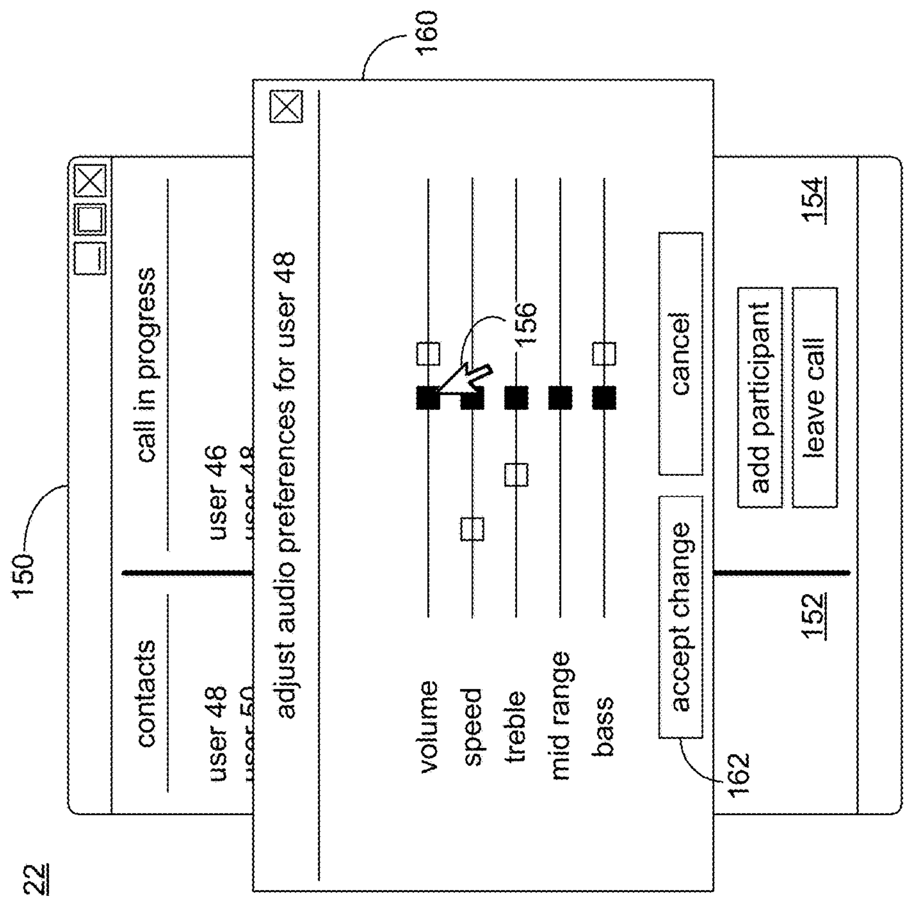
FIG. 5 graphically depicts a user interface that may be generated, at least in part, by the comprehension process of FIG. 1.

In an embodiment, and referring also to FIG. 5, in response to receiving 100 the request to modify an audio characteristic associated with the first user, comprehension process 10 (alone and/or in combination with one or more of communication application 20 and/or client application 22) may provide audio characteristics interface 160. Via audio characteristics interface 160, comprehension process 10 may allow user 46 to establish one or more audio preferences relative to a specific individual (e.g., user 48) and/or group of individuals for voice communications, which may, for example, be transacted at least in part via communication process 20. While the following description may generally relate to an embodiment in which a user may modify audio characteristics and/or establish audio preferences associated a third party (e.g., to thereby modify incoming or received audio characteristics), in other embodiments, the user may modify audio characteristics associated with himself (e.g., outgoing and/or transmitted audio characteristics) for all communications and/or for communications associated with one or more identified communication participants. As such, in some embodiments, the user may modify his own audio characteristics, e.g., to improve comprehension by other users.

As shown in FIG. 5, in an example embodiment, audio characteristics interface 160 may allow one or audio characteristics associated with user 48 to be modified for voice communications with user 46. That is the modified audio characteristics may establish an audio preference of user 48 with respect to user 46 for voice communications such that audio received by user 46 from user 48 may be modified in accordance to with the audio preferences. As shown, comprehension process 10 (alone and/or in combination with one or more of communication process 20 and client application 20) may allow various audio characteristics to be modified via audio characteristics interface 160. For example, audio characteristics interface 160 may include one or more audio characteristics (e.g., volume, speed, treble, mid-range, and bass in the illustrated example embodiment) and one or more adjustment interfaces (e.g., adjustment sliders that may be dragged to change a value associated with an audio characteristic in the illustrated example embodiment) associated with each audio characteristic. While audio characteristics interface 160 is shown including five audio characteristics that may be modified (e.g., namely volume, speed, treble, mid-range, and bass) various additional and/or alternative audio characteristics may be modified depending upon design criteria and user need. Further, while adjustment sliders are depicted as an example adjustment interface, various additional/alternative interfaces may be equally utilized for adjusting audio characteristics.

In the example embodiment, audio characteristics interface 160 may allow a volume of audio associated with user 48 to be modified. For example, user 48 may generally speak relatively softly. Increasing the volume associated with user 48 may generally increase the amplification associated with user 48 (e.g., without otherwise increasing the volume of the call and/or the volume associated with other participants in a situation of a multi-party call). Audio characteristics interface 160 may further allow a speed of audio associated with user 48 to be adjusted. For example, user 48 may generally speak at a relatively fast pace. Audio characteristics interface 160 may allow a speed of audio associated with user 48 to be reduced (e.g., with and/or without tonal corrections). Further, audio characteristics interface 160 may allow one or more tonal characteristics (e.g., treble, mid-range, and bass) associated with audio from user 48 to be adjusted.

In an embodiment, comprehension process 10 (alone and/or in combination with one or more of communication application 20 and client application 22) may provide 102 one or more suggested modified audio characteristics for the first user. For example, as shown in the example audio characteristics interface 160, one or more solid adjustment sliders may generally indicate a current setting of each respective audio characteristic. Further, one or more outlined adjustment sliders may indicate a suggested modified audio characteristic for the first user (e.g., for user 48). In an embodiment, user 46 may accept one or more of the suggested modified audio characteristics for user 48, e.g., by selecting, via onscreen pointer 156, one or more of the outlined adjustment sliders indicating a suggested modified audio characteristic for user 48. Various additional/alternative mechanisms for accepting one or more of the suggested modified audio characteristics may similarly be utilized.

In an embodiment, the one or more suggested modified audio characteristics for the first user may be based on, at least in part, one or more audio preferences established by another user. For example, and continuing with the above illustrative embodiment, in such an embodiment, the one or more suggested modified audio characteristics for the first user may be based on, at least in part, one or more audio preferences established for user 48 by a user other than user 46. In an example embodiment, the one or more suggested audio preferences may include audio preferences established for the first user. For example, the one or more suggested audio preferences may include one or more suggested audio preferences that may have been established for voice communications with user 48, in particular, by one or more other users. In such an embodiment, comprehension process may automatically provide 102 suggested user-specific preferences for tailoring audio characteristics received from user 48 based on, at least in part, past user-specific preferences set by other users for user 48. Consistent with such an embodiment, comprehension process 10 may provide 102 the one or more suggested modified audio characteristics for user 48 based on a determination of modified audio characteristics that may have been established for user 48 by one or more other users. In some embodiments, the one or more audio characteristics that may have been established for user 48 by one or more other users may be stored, e.g., on storage device 16 coupled to server computer 12, e.g., which may be queried and/or otherwise accessed by comprehension process 10.

In an example embodiment, comprehension process 10 may provide 102 one or more suggested modified audio characteristics based on one or more audio preferences established by another user, in which the one or more audio preferences may include audio preferences established for a second user having a similar attribute to the first user. For example, in an embodiment, comprehension process 10 may provide 102 one or more suggested modified audio characteristics for user 48 based on one or more audio preferences that may have been established for user 50, who may have a similar attribute to user 48. Example attributes may include, but are not limited to, geographic location, gender, native spoken language, etc.

In an example, the similar attribute may include a geographic location associated with the first user. In such an example, user 48 may reside in Ireland. Similarly, user 50 may also reside in Ireland. According to such an embodiment, comprehension process 10 may provide 102 one or more suggested modified audio characteristics for user 48 based on one or more audio preferences that have been established for user 50, who also resides in Ireland. Based on the similar attribute of user 50 and user 48 (i.e., both users residing in Ireland), comprehension process 10 may provide 102 one or more suggested modified audio characteristics for user 48 based on audio preferences established for user 50.

In a related embodiment, comprehension process 10 may provide 102 one or more suggested modified audio characteristics for user 48 based on, at least audio preferences established by other users for individuals having a similar attribute as user 48. For example, user 46 may reside in the United States. Further, a statistically significant number of users residing in the United States may find that users residing in Ireland tend to speak relatively fast, e.g., as evidenced by a statistically significant number of users in the United States setting a reduced speed audio characteristic for users residing in Ireland. Accordingly, comprehension process 10 may provide 102 a suggested modified audio characteristic including a reduced speed characteristic for user 48 based on, at least in part, a reduced speed characteristic associated with other users residing in Ireland.

Comprehension process 10 may receive 104 an input of one or more modified audio characteristics for the first user for the voice communication system. For example, user 46 may adjust (e.g., via the one or more adjustment sliders associated with the one or more audio characteristics) one or more audio characteristics for user 48 and/or may wish to accept any suggested modified audio characteristics for user 48. Once desired adjustments have been made, user 46 may select (e.g., using onscreen pointer 156) accept change button 162. In response to user 46 selecting accept change button 162, comprehension process 10 may receive 104 an input of one or more modified audio characteristics for user 48, e.g., based on, at least in part, the suggested modified audio characteristics and/or based on, at least in part, one or audio characteristics adjusted by user 46 (e.g., using the adjustment sliders). Accordingly, in some embodiments, receiving 104 the input of one or more modified audio characteristics for the first user may include receiving a selection of one or more of the suggested modified audio characteristics for the first user (e.g., which may include at least a portion of the one or more audio preferences established by another user).

In an embodiment, comprehension process 10 may associate 106 a user-specific audio preference with the first user for voice communications on the voice communication system. The user-specific audio preference may include the one or more modified audio characteristics. For example, in response to receiving 104 the input of the one or more modified audio characteristics (e.g., in response to user 46 selecting accept change button 162, etc.), comprehension process 10 may associated the modified audio characteristics with user 48 to thereby associate 106 a user-specific audio preference with user 48 for voice communications with user 46 over the voice communication system. As such, comprehension process 10 may establish audio preferences relative to a specific individual (and/or group of individuals) for unified telephony calls, or other voice communications, with the individual establishing the audio preferences. For example, assume that user 46 accepted the suggested modified audio characteristics shown in FIG. 5 (e.g., an increase in volume, a reduction in speed and treble, and an increase in bass). Comprehension process 10 may associate 106 the modified audio characteristics with user 48 to provide a user-specific audio preference with user 48 for user 46.

In an embodiment, comprehension process 10 may modify 108 an audio characteristic of the first user for a subsequent voice communication based on, at least in part, the associated user-specific preference. For example, the user-specific preference associated with user 48 may include a persistent user specific preference that may be used for one or more later calls between user 48 and user 46. Accordingly, in a later call between user 46 and user 48 comprehension process 10 may modify 108 an audio characteristic associated with user 48 in accordance with the user-specific preference associated 106 with user 48 for user 46. Consistent with the above-stated example, comprehension process 10 may increase the volume and bass of the audio from user 48 and may decrease the speed and treble of the audio from user 48. In various embodiments, the user-specific preference may persist until changed (e.g., by user 46), for a defined period of time, for a defined number of subsequent calls, or based on another criterion.

In an embodiment, comprehension process 10 may associate 110 the modified audio characteristics with at least a third user based on, at least in part, a similar attribute of the third user to the first user. The similar attribute may include, for example, geographic location, native spoke language, gender, or the like. For example, user 48 may reside in Ireland. Similarly, user 52 may also reside in Ireland. Based on, at least in part, the similar attribute between user 52 and user 48 (e.g., both users reside in Ireland), comprehension process 10 may associate 110 the modified audio characteristics associated with user 48 (e.g., which may be embodied in a user-specific preferences associated with user 48 for user 46) with user 52. The associated 110 may be based on, at least in part, a likelihood that speech characteristics of user 48 and of user 52 may be, at least in part, related to the similar attribute. According to such an embodiment, the modified audio characteristics may be applied across multiple callers having a similar attribute, such as geographic location, native spoken language, gender, or the like. The modified audio characteristics applied across the multiple callers may be used to modify voice characteristics for the multiple callers during subsequent communications with the multiple callers.

In an embodiment, comprehension process 10 may propagate 112 the user-specific audio preference to one or more additional users. For example, user 46 may wish to share the user-specific audio preference associated with user 48 with one or more peers or colleagues of user 46. Propagating 112 the user-specific audio preference may include any mechanism by which the user-specific audio preference may be utilized by another user. For example, comprehension process 10 may allow an association to be created between the other users and the user-specific audio preference, may allow the user-specific audio preference to forwarded (e.g., by email, a shared space, a link, etc.), or to be otherwise utilized by the other users.

Additionally, while various embodiments and features have been described herein, it will be apparent to one having skill in the art that the various embodiments and features may be susceptible to combination with one another and/or to various additional/alternative combinations. All such combination of subject matter disclosed herein is intended to be contemplated by the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:

receiving, on a processor, a request to modify an audio characteristic associated with a first user for a voice communication system;

displaying, on a graphical user interface, one or more suggested modified audio characteristics for the first user, wherein the one or more suggested modified audio characteristics for the first user is based upon, at least in part, past user-specific preferences for the first user received by one or more other users;

receiving, from the graphical user interface, a selection of the one or more suggested modified audio characteristics for the first user for the voice communication system from a particular user; and associating, on the processor, a particular user-specific audio preference with the first user for voice communications on the voice communication system for the particular user.

2. The computer-implemented method of claim 1, wherein the one or more audio preferences include audio preferences established for the first user.

3. The computer-implemented method of claim 1, wherein the one or more audio preferences include audio preferences established for a second user having a similar attribute to the first user.

4. The computer-implemented method of claim 3, wherein the similar attribute includes a geographic location associated with the first user.

5. The computer-implemented method of claim 1, further comprising modifying an audio characteristic of the first user for a subsequent voice communication based on, at least in part, the particular user-specific audio preference.

6. The computer-implemented method of claim 5, further comprising associating the modified audio characteristics with at least a third user based on, at least in part, a similar attribute of the third user to the first user.

7. The computer-implemented method of claim 1, further comprising propagating the particular user-specific audio preference to one or more additional users.

8. A non-transitory computer readable medium having a plurality of instructions stored thereon, which, when executed by a processor, cause the processor to perform operations comprising:

receiving a request to modify an audio characteristic associated with a first user for a voice communication system;

displaying on a graphical user interface, one or more suggested modified audio characteristics for the first user, wherein the one or more suggested modified audio characteristics for the first user is based upon, at least in part, past user-specific preferences for the first user received by one or more other users;

receiving from the graphical user interface, a selection of the one or more suggested modified audio characteristics for the first user for the voice communication system from a particular user; and associating a particular user-specific audio preference with the first user for voice communications on the voice communication system for the particular user.

9. The non-transitory computer readable medium of claim 8, wherein the one or more audio preferences include audio preferences established for the first user.

10. The non-transitory computer readable medium of claim 8, wherein the one or more audio preferences include audio preferences established for a second user having a similar attribute to the first user.

11. The non-transitory computer readable medium of claim 10, wherein the similar attribute includes a geographic location associated with the first user.

12. The non-transitory computer readable medium of claim 8, further comprising instructions for modifying an audio characteristic of the first user for a subsequent voice communication based on, at least in part, the particular user-specific audio preference.

13. The non-transitory computer readable medium of claim 12, further comprising instructions for associating the modified audio characteristics with at least a third user based on, at least in part, a similar attribute of the third user to the first user.

14. The non-transitory computer readable medium of claim 8, further comprising instructions for propagating the particular user-specific audio preference to one or more additional users.

15. A computing system comprising:

one or more processors configured to:

receive a request to modify an audio characteristic associated with a first user for a voice communication system;

display, on a graphical user interface, one or more suggested modified audio characteristics for the first user, wherein the one or more suggested modified audio characteristics for the first user is based upon, at least in part, past user-specific preferences for the first user received by one or more other users;

receive, from the graphical user interface, a selection of the one or more suggested modified audio characteristics for the first user for the voice communication system from a particular user; and associate a particular user-specific audio preference with the first user for voice communications on the voice communication system for the particular user.

16. The computing system of claim 15, wherein the one or more audio preferences include audio preferences established for the first user.

17. The computing system of claim 15, wherein the one or more audio preferences include audio preferences established for a second user having a similar attribute to the first user.

18. The computing system of claim 17, wherein the similar attribute includes a geographic location associated with the first user.

19. The computing system of claim 15, wherein the one or more processors are further configured to modify an audio characteristic of the first user for a subsequent voice communication based on, at least in part, the particular user-specific audio preference.

20. The computing system of claim 19, wherein the one or more processors are further configured to associate the modified audio characteristics with at least a third user based on, at least in part, a similar attribute of the third user to the first user.

21. The computing system of claim 15, wherein the one or more processors are further configured to propagate the particular user-specific audio preference to one or more additional users.

* * * * *